US010050651B2

(12) United States Patent
Edwards et al.

(10) Patent No.: US 10,050,651 B2
(45) Date of Patent: Aug. 14, 2018

(54) WIRELESS COMMUNICATION SYSTEM AND METHOD

(71) Applicant: ROLLS-ROYCE PLC, London (GB)

(72) Inventors: Huw L. Edwards, Derby (GB); Max C Y Ong, Dalkeith (AU); Haydn A. Thompson, Sheffield (GB)

(73) Assignee: ROLLS-ROYCE plc, London (GB)

( * ) Notice: Subject to any disclaimer, the term of this patent is extended or adjusted under 35 U.S.C. 154(b) by 482 days.

(21) Appl. No.: 14/730,838

(22) Filed: Jun. 4, 2015

(65) Prior Publication Data
US 2015/0381224 A1 Dec. 31, 2015

(30) Foreign Application Priority Data

Jun. 26, 2014 (GB) .................................. 1411341.9

(51) Int. Cl.
| | |
|---|---|
| H04B 1/10 | (2006.01) |
| B63H 5/125 | (2006.01) |
| H04B 7/02 | (2018.01) |
| H04L 1/04 | (2006.01) |
| G01M 15/00 | (2006.01) |

(52) U.S. Cl.
CPC .......... *H04B 1/1081* (2013.01); *G01M 15/00* (2013.01); *H04B 7/02* (2013.01); *H04L 1/04* (2013.01); *B63H 5/125* (2013.01); *B63H 2005/1256* (2013.01)

(58) Field of Classification Search
CPC .......... B63H 5/125; B63H 1/18; G08C 17/02; H01P 3/122; H04B 13/00; H04B 1/10; H04B 1/1081; H04B 7/08
USPC ............................................. 440/66
See application file for complete search history.

(56) References Cited

U.S. PATENT DOCUMENTS

2013/0233368 A1  9/2013  Dowben

FOREIGN PATENT DOCUMENTS

| EP | 1 971 096 A2 | 9/2008 |
| EP | 2 720 313 A1 | 4/2014 |
| WO | 2012/035948 A1 | 3/2012 |

OTHER PUBLICATIONS

Oct. 26, 2015 Search Report issued in European Patent Application No. 15 17 0707.

*Primary Examiner* — Lars A Olson
(74) *Attorney, Agent, or Firm* — Oliff PLC

(57) ABSTRACT

A marine propulsor comprises: a stationary part and a movable part which is movable relative to the stationary part; and a wireless communication system, comprising at least one transmitter which is disposed in the movable part and is configured to transmit an electromagnetic data signal and at least one receiver which is disposed in the stationary part and is configured to receive the electromagnetic data signal. The wireless communication system includes a diversity scheme for mitigating multipath distortion of the electromagnetic data signal between the at least one transmitter and the at least one receiver.

20 Claims, 8 Drawing Sheets

WIRELESS COMMUNICATION SYSTEM AND METHOD

The present invention relates to a marine propulsor, in particular comprising a wireless communication system.

In engineering applications in many industries, there is a need to communicate data concerning the condition of a machine or its components. Examples include various types of power plants used in aircraft, motor vehicles, marine vessels, and power generation. Such machines typically comprise sensors for detecting parameters such as speed of moving components, vibration, oil pressure, temperature, and the like. The sensors are connected to a telemetry system which communicates the detected parameters for analysis and use by the operator. In particular, the data may enable the operator to anticipate potential component failures and plan maintenance schedules.

In some applications, communicating the data is difficult due to the environmental conditions. An example of a challenging environment is a marine azimuth thruster. This type of marine propulsor is mounted to the hull of a vessel below the waterline and typically rotates 360 degrees around the vertical axis in order to propel and steer the vessel. The internal structure of the thruster includes metal walls or bulkheads which divide the thruster into compartments that contain, among other components, machinery for driving the thruster's propeller. These compartments may be filled with oil for lubricating and cooling the drive machinery.

The thruster may be equipped with a condition monitoring system for determining the health of the thruster. Such a system typically comprises sensors and other equipment, connected by wiring which is routed around the internal structure of the thruster. That is, the wires pass through the metal bulkheads and the oil. This sort of wiring arrangement is undesirable because it is complex, time-consuming and expensive to install. In addition, a slip ring is usually located at the interface between the rotating and stationary parts of the thruster, providing a power source for the condition monitoring system and a path for data to flow from the system to the vessel. A robust and reliable means of data communication is important because the thruster is required to operate reliably for extended periods, typically of about five to seven years, without servicing or repair. However, slip rings are typically large, bulky items which tend to be expensive because they need to be custom-made to fit any given size of thruster, of which there may be many in a manufacturer's product range.

For these reasons it would be preferable to have a wireless communication system, which could convey high-quality data signals through the internal structure of the thruster (and liquids therein) and preferably with low power consumption. More generally, it would be desirable to have a wireless communication system which could convey high-quality data signals through the internal structures of machines which comprise physical obstructions such as metal walls and may contain oil or other liquids, at low power. While wireless communication systems are commonly used to transfer information between two or more points which are not connected by an electrical conductor such as a wire (e.g. using radio waves, light, sound, magnetic or electric fields), these are generally designed to propagate signals through free air and are not suited to conveying data through metal walls and liquids, such as oil, which tend to attenuate wireless signals.

It is an object of the present invention to provide a wireless communication system which alleviates the problems of the prior art at least to some extent.

The invention is set out in the accompanying claims.

According to an aspect, there is provided a marine propulsor, comprising: a stationary part and a movable part which is movable relative to the stationary part; and a wireless communication system, comprising at least one transmitter which is disposed in the movable part and is configured to transmit an electromagnetic data signal and at least one receiver which is disposed in the stationary part and is configured to receive the electromagnetic data signal; wherein the wireless communication system includes a diversity scheme for mitigating multipath distortion of the electromagnetic data signal between the at least one transmitter and the at least one receiver.

Diversity schemes mitigate the effects of multipath distortion of the EM data signal so that the transmission power may be reduced. Counter intuitively, in the marine thruster environment, which includes metal obstacles and oil, reducing the level of transmission power can improve the strength and quality of the data signal. Furthermore, the provision of a wireless link with a low power demand means that the conventional slip ring can be eliminated, thereby saving weight and cost.

The electromagnetic data signal may comprise raw or processed sensor data, control data, or network data. The electromagnetic data signal may be a radio frequency signal or a microwave frequency signal.

The at least one transmitter and/or the at least one receiver may comprise a directional antenna.

The diversity scheme may comprise frequency diversity, the at least one transmitter being configured to transmit the electromagnetic data signal at different frequencies.

The movable part may be rotatively movable relative to the stationary part about an axis of the thruster so that the at least one transmitter is rotatively movable relative to the at least one receiver.

The diversity scheme may comprise spatial diversity, the wireless communication system comprising at least two transmitters disposed in the movable part to provide transmission diversity and/or at least two receivers disposed in the stationary part to provide reception diversity. The at least two transmitters and/or the at least two receivers may be located proximate one another. Or, the at least two transmitters and/or the at least two receivers may be spaced apart from each other. The at least two transmitters and/or the at least two receivers may be angularly spaced apart from each other with respect to the said axis of the thruster. The at least two transmitters and/or the at least two receivers may be spaced about 180 degrees apart from each other with respect to the said axis of the thruster. During one complete revolution of the movable part relative to the stationary part, at least one line of sight may exist for the electromagnetic data signal between at least one said transmitter and at least one said receiver.

The wireless communication system may comprise two transmitters and one receiver. Or, the wireless communication system may comprise two receivers and one transmitter. Or, the wireless communication system may comprise two transmitters and two receivers.

The marine propulsor may contain a liquid in the path of the electromagnetic data signal. The liquid may comprise an oil, a grease, a gel, a foam, or a fuel, for example a hydrocarbon fuel.

The marine propulsor may include a thermoelectric generator which is configured to power the wireless communication system. The thermoelectric generator may be configured to generate power using a temperature difference between a liquid inside the marine propulsor and water outside the marine propulsor. The liquid inside the marine propulsor may be of the same type as the liquid in the path of the electromagnetic data signal. The thermoelectric generator may be configured to provide power in the range of about 0.1 to 5 Watts.

The marine propulsor may include a sensor which is configured to detect a physical parameter of the marine propulsor, the electromagnetic data signal corresponding to the physical parameter. The sensor may be a vibration sensor.

The marine propulsor may comprise an azimuth thruster.

According to another aspect, there is provided a wireless communication system for a marine propulsor, the marine propulsor including a stationary part and a movable part which is movable relative to the stationary part, the wireless communication system comprising at least one transmitter for location in the movable part and being configured to transmit an electromagnetic data signal and at least one receiver for location in the stationary part and being configured to receive the electromagnetic data signal, wherein the wireless communication system includes a diversity scheme for mitigating multipath distortion of the electromagnetic data signal between the at least one transmitter and the at least one receiver.

According to another aspect, there is provided a gas turbine engine, comprising: a stationary part and a movable part which is movable relative to the stationary part; and a wireless communication system, comprising at least one transmitter which is disposed in the movable part and is configured to transmit an electromagnetic data signal and at least one receiver which is disposed in the stationary part and is configured to receive the electromagnetic data signal; wherein the wireless communication system includes a diversity scheme for mitigating multipath distortion of the electromagnetic data signal between the at least one transmitter and the at least one receiver.

According to another aspect, there is provided a method of controlling a wireless communication system of a marine propulsor, the marine propulsor comprising a stationary part and a movable part which is movable relative to the stationary part, the wireless communication system comprising at least one transmitter which is disposed in the movable part and is configured to transmit an electromagnetic data signal, and at least one receiver which is disposed in the stationary part and is configured to receive the electromagnetic data signal, the method comprising: establishing a data signal between the at least one transmitter and the at least one receiver; determining whether the data signal quality and/or strength are within defined limits; if the data signal quality and/or strength are not within the defined limits, increasing or decreasing transmission power in order to bring the data signal quality and/or strength within the defined limits; if the data signal quality and/or strength are still not within the defined limits, adopting a diversity scheme for mitigating multipath distortion of the electromagnetic data signal between the at least one transmitter and the at least one receiver in order to bring the data signal quality and/or strength within the defined limits; and if the data signal quality and/or strength are within the defined limits, decreasing transmission power to a minimum level required to maintain the data signal quality and/or strength within the defined limits.

The method of controlling the wireless communication system ensures that the strength and quality of the data signal is kept within specified limits while keeping the power consumption to a minimum.

Adopting the diversity scheme may comprise adopting frequency diversity. Adopting frequency diversity may include changing from a first frequency to a second frequency of the data signal. Adopting frequency diversity may further include blacklisting the first frequency.

Adopting the diversity scheme may comprise adopting spatial diversity. Adopting spatial diversity may include adopting transmission diversity. Adopting spatial diversity may include adopting reception diversity.

The method may include applying forward error correction to control errors in the data signal.

The method may include adopting a predetermined transmission power setting according to a position of the marine propulsor.

According to another aspect, there is provided a thermoelectric device for a marine propulsor, the thermoelectric device being configured when installed in the marine propulsor to generate power using a temperature difference between a relatively hotter liquid inside the marine propulsor and relatively cooler water outside the marine propulsor, the thermoelectric device comprising thermal insulation for providing a cold spot at an interface between the thermoelectric device and the marine propulsor.

The low power demand of the wireless communication system enables the use of a low power thermoelectric power source instead of a large and bulky slip ring. Unlike a slip ring, such a power device can be conveniently located anywhere in the thruster where it can exploit the temperature difference between the oil and the sea water. The thermal efficiency is enhanced by thermally insulating the device to provide a cold spot at the device-thruster interface.

The thermoelectric device may include a compressible metal alloy for providing thermal contact with the marine propulsor at the said interface.

The use of a compressible (or "soft") metal alloy provides an effective thermal contact.

Embodiments will now be described, by way of example, with reference to the accompanying figures in which.

Figure 1:
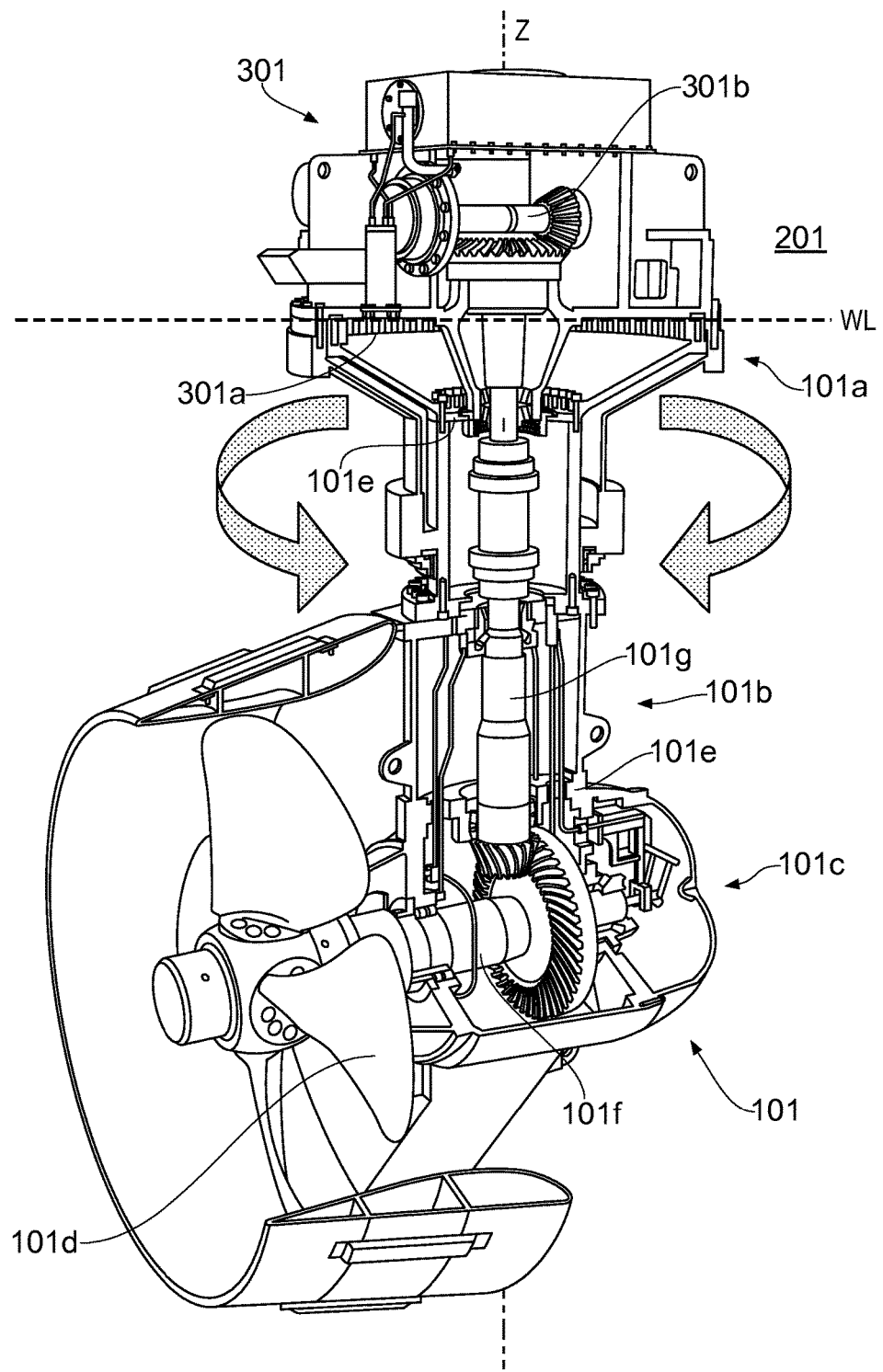
FIG. 1 is a sectional view of a marine azimuth thruster.

Referring to FIG. 1, a conventional azimuth thruster 101 is mounted to the hull 201 of a marine vessel. With the vessel in the water, most of the thruster 101 is submerged below the water line WL. The thruster 101 comprises an upper portion 101a for mounting to the hull 201, a generally elongate middle portion 101b which defines a longitudinal (vertical) axis Z of the thruster 101, and a lower portion 101c which includes a propeller 101d. Here, the upper and lower portions 101a, 101c are separated from the middle portion 101b by internal dividing structural walls, or bulkheads 101e. Thus the upper, lower and middle portions 101a-c comprise thruster chambers or compartments which contain a liquid or liquids (not shown) for lubrication and/or cooling of the drive mechanisms of the thruster 101. The liquid is capable of carrying (propagating) an electromagnetic data signal. The term "liquid" as used herein is intended to encompass all fluids which exhibit liquid-like behaviour, including oils, greases, gels, foams, and the like. In this embodiment, the liquid medium is an oil.

The drive mechanisms of the thruster 101 will now be described. The upper portion 101a of the thruster 101 includes a gear compartment 301, which is located in the hull 201 and is in fixed relationship there with. The upper portion 101a is further provided with a rotative coupling 301a, comprising a bearing and a steering gear arrangement, which divides the upper portion 101a into a fixed or stationary section (shown above the water line WL in FIG. 1 and including the gear compartment 301) and a movable section (shown below the water line WL in FIG. 1).

The propeller 101d is connected to an horizontal output shaft 101f which is disposed in the lower portion 101c of the thruster 101 and which takes its drive, via a lower bevel gear, from a lower end of a vertical drive shaft 101g which extends through the middle portion 101b (along the vertical axis Z) of the thruster 101 and through the bulkheads 101e. An upper end of the vertical drive shaft 101g extends through the rotative coupling 301a and is driven, via an upper bevel gear, by an horizontal input shaft 301b which is disposed in the gear compartment 301. In this embodiment, the horizontal input shaft 301b is driven by a diesel engine (not shown) which is disposed in the hull 201 of the vessel. In the art of marine propulsors this arrangement of horizontal and vertical shafts is sometimes referred to as a 'Z-drive'.

Thus the thruster 101 may be rotated about its vertical axis Z, relative to the hull 201, in order to provide accurate manoeuvring of the vessel. The rotation of the thruster 101 may be automatically or manually controlled, for example from the bridge of the vessel.

Figure 2:
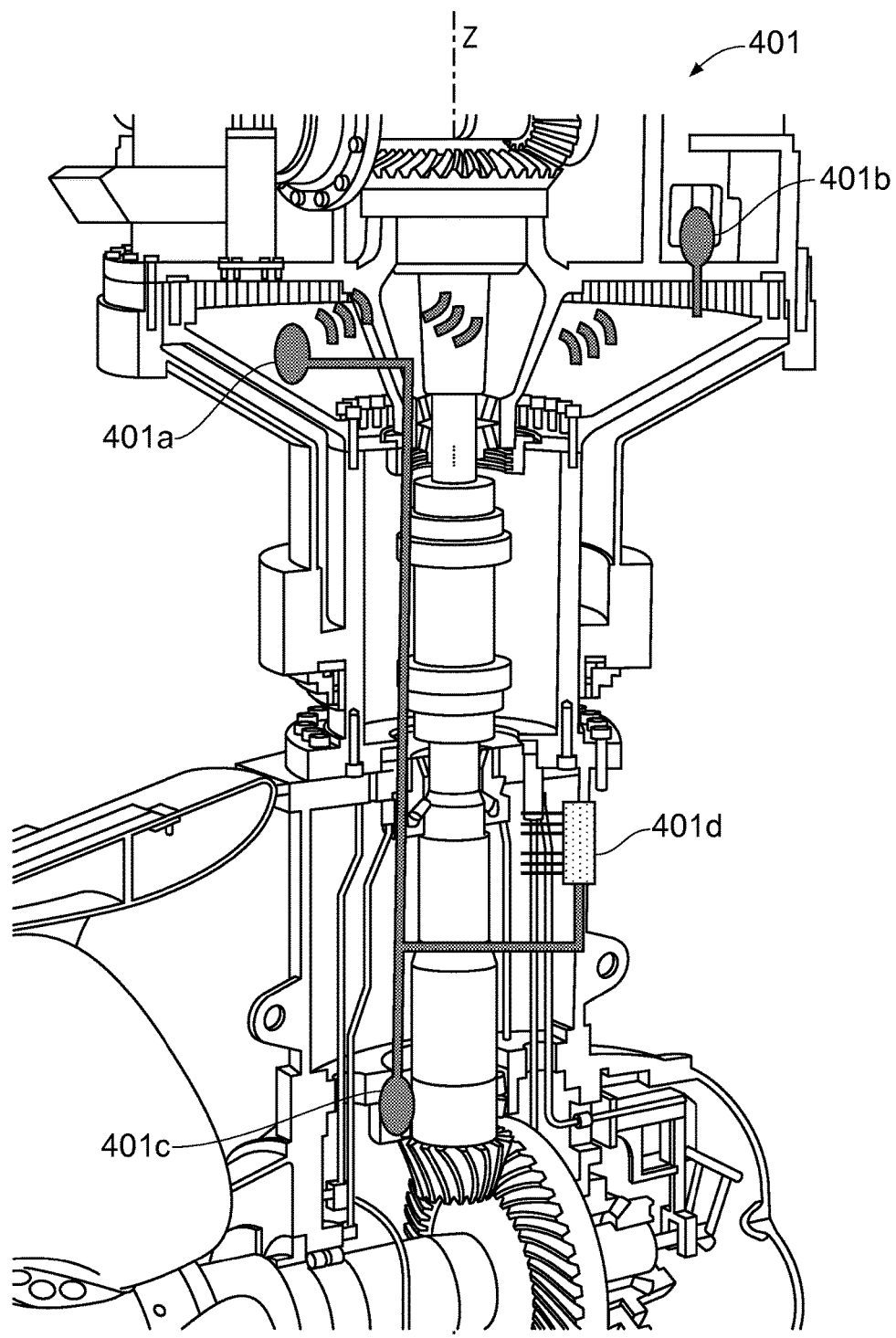
FIG. 2 shows a wireless communication system installed in the thruster of FIG. 1.

Referring now to FIG. 2, a thruster 101 is equipped with a wireless communication system 401 in accordance with the present invention. In this embodiment, the wireless communication system 401 comprises a transmitter 401a and a receiver 401b, which are respectively configured to transmit and receive an electromagnetic data signal. In this embodiment, the transmitter 401a is located in the movable section of the upper portion 101a of the thruster 101, and the receiver 401b is located in the gear compartment 301, i.e. in the fixed section of the upper portion 101a.

In this embodiment, the transmitter 401a comprises an antenna. In this embodiment, the transmitter antenna comprises a directional antenna, for example a flat panel directional antenna.

In this embodiment, the receiver 401b comprises an antenna. In this embodiment, the receiver antenna comprises a directional antenna, for example a flat panel directional antenna. In this embodiment, the receiver antenna extends through a hole provided at the interface between the fixed and movable sections of the upper portion 101a of the thruster 101.

In this embodiment, the thruster 101 is equipped with a transducer which is configured to measure at least one physical parameter of the thruster 101. In this embodiment, the transducer is a vibration sensor 401c which measures vibration in the thruster 101. It will be understood that the vibration sensor is merely an example of a transducer or similar device which may be found in a health-monitoring or diagnostic system of a thruster, and which can provide useful data to be conveyed by the wireless communication system. Other examples include, but are not limited to, devices which detect temperature, torque, speed, acoustic noise, flow rates, and oil quality.

In this embodiment, the thruster 101 is also equipped with a power source which may power the transmitter 401a, the vibration sensor 401d, and/or processing/control system elements of the system. In this embodiment, the power source is a thermoelectric generator 401d which is mounted to an internal surface of a wall of the thruster 101 and is configured to harvest power from a difference in temperature between the (relatively hotter) oil inside the thruster 101 and the (relatively cooler) water outside the thruster 101. Typically, the temperature of the oil is about 55 to 90 degrees Celsius and the temperature of the water is about 4 to 20 degrees Celsius. In this embodiment, the power output of the thermoelectric generator 401d is in the range of about 0.1 to 5 Watts. In this embodiment, the power is transmitted from the thermoelectric generator 401d by electrical wiring.

Figure 3:
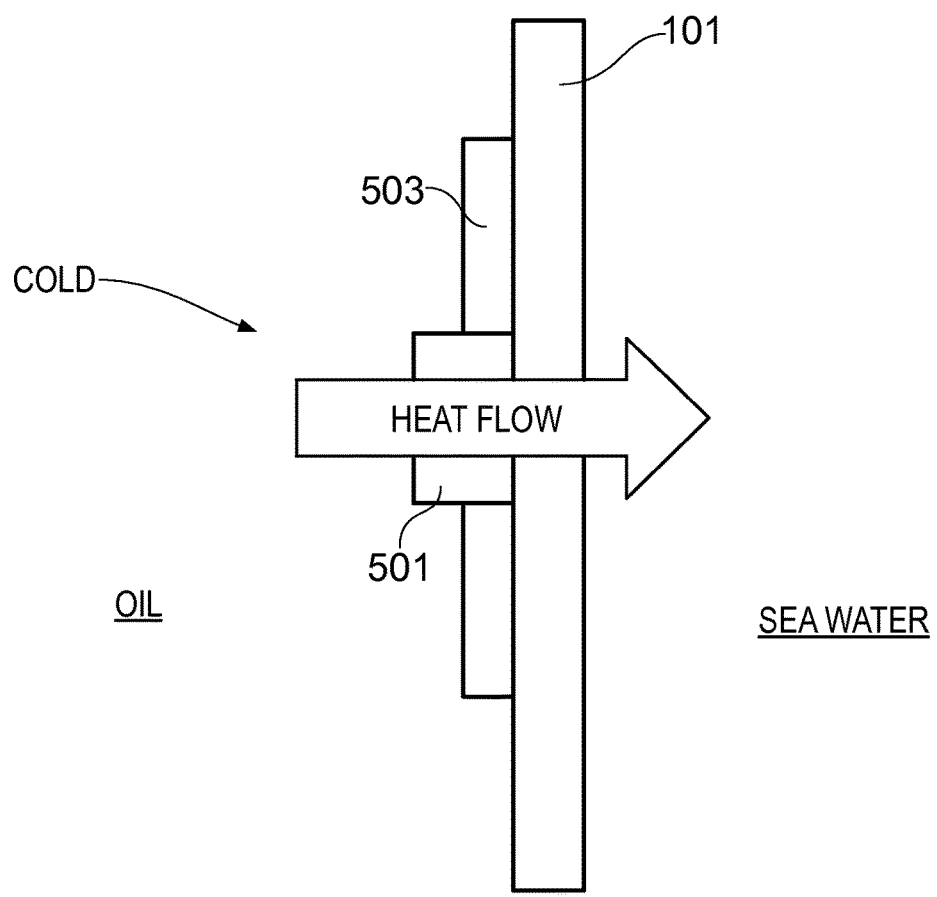
FIG. 3 shows a thermoelectric element of the wireless communication system.

With reference to FIG. 3, a thermoelectric 501 is a solid state semiconductor device that converts a sustained temperature difference over its two sides into electrical power. Heat essentially flows through the device, with a proportion of that heat converted into electrical power (i.e. more heat will flow into the device than out of it). The device uses an effect known as the Seebeck Effect, where the heat on one side excites carriers (electrons or holes depending on whether it is a p-type or n-type semiconductor), creating carrier diffusion, which leads to a concentration of carriers in one half of the semiconductor. The carriers have a charge, therefore a voltage difference is built up, and using both a p-type and n-type semiconductor together, electrical power can be generated.

The thermoelectric 501 may include heat exchangers (not shown) to ensure low thermal resistance between the heat source (hot oil) and the thermoelectric 501. The heat exchangers may be larger than the thermoelectric 501, and therefore a heat spreader (such as copper) may be used. Cold thermal contact between all layers ensures that heat flows through the thermoelectric 501. This includes the contact with the wall of the thruster 101, to ensure that good contact is made with the cold sea water. Contact means may include high pressure clamping, for example using malleable pastes or gels, or soft metal alloys (i.e. metals with good thermal conductivity, but that are also compressible, enabling a good thermal contact to be made).

To ensure that the cold sea water can impact the thermoelectric 501, a cold spot may be provided by thermal insulation 503 at the area surrounding the thermoelectric 501. This prevents the hot oil from heating the wall of the thruster 101 in the vicinity of the thermoelectric 501. By extending the area and thickness of the insulation 503 surrounding the thermoelectric 501, the thermal resistance to the cold spot in the wall of the thruster 101, to which the thermoelectric 501 is connected, increases. This ensures a temperature difference between the oil and sea water is maintained.

In this embodiment, a back-up battery (not shown) is charged by the thermoelectric generator 401d and can power the wireless communication system 401, for example in the event that power is not available from the thermoelectric generator 401d.

As an alternative to the thermoelectric generator 401d, the power source for the wireless communication system can be a battery. Or, the power source may comprise an oil flow generator or a small shaft/gear/bearing generator.

Referring again to FIG. 2, the operation of the wireless communication system 401 will now be described. The vibration sensor 401c detects vibration in the thruster 101 and sends an appropriate data signal to the transmitter 401a. The transmitter 401a transmits a corresponding data signal, in this example a radio frequency (RF) data signal, which is propagated across the internal structure of the thruster 101, and the oil therein, and is picked up by the receiver 401b. The receiver 401b, which may be considered to be an access point node, passes the received data signal to the marine vessel via a wired or wireless connection (not shown), or alternatively via a non-metal port in the gear compartment 301 which will allow the signal to escape into the vessel. Once the data signal has been conveyed to the vessel from the receiver 401b, the data signal may be processed. Alternatively, the data signal may be processed at any stage prior to transmission to the vessel. Processing may include compressing, for example to characteristic data such as fast Fourier transforms, or if particular limits (e.g. temperatures) are exceeded.

The various compartments of the thruster 101 may comprise gas (e.g. air) as well as oil (or other liquid medium). In this case the EM data signals will propagate through the gas as well as the oil.

As can be easily understood from FIG. 2, if the thruster 101 is revolving about its vertical axis Z then the position of the moving transmitter 401a will be changing relative to the position of the stationary receiver 401b. As a result, the path for the data signal, between the transmitter 401a and the receiver 401b, will also change. Furthermore, the data signal's line-of-sight between the transmitter 401a and the receiver 401b may be lost. In these conditions, the data signal will encounter various structural (typically metallic) parts of the thruster 101, as well as the oil therein, which may reflect, refract, diffract, or otherwise interfere with, the data signal, thereby causing multipath propagation of the data signal between the transmitter 401a and the receiver 401b. As a result, part of the data signal from the transmitter 401a may be delayed as it travels a longer distance to the receiver 401b than does another part of the signal which takes a more direct path. This multipath distortion could cause data corruption or nulling of the data signal, and the data signal may be of low quality even though the signal strength is high. In this example, the system is handling vibration data at about 25 kHz, which is 4 to 5 orders of magnitude greater than typical temperature sensor data at about 10 Hz.

Signal fading and poor link quality is unacceptable because a robust and reliable data signal of high quality is an important requirement for the thruster 101.

In multipath distortion conditions there will be some level of dependence on bounced signals or "scatter performance". Messages may be lost when error rates go beyond an acceptable threshold, especially at higher data speeds. Data correction and re-transmits both introduce additional processor and network overheads and actual achievable throughput (data rate) can slow dramatically or be lost completely under severe multipath fading. Under such conditions, it is important to monitor the quality (not just the strength) of the data signal. Typically a high data rate is required, for example: 65 kHz, 24 bit resolution, 1.5 Mbits/s or higher.

The potential problem of multipath distortion is here overcome by the inclusion of a diversity scheme in the wireless communication system 401. In this embodiment, the diversity scheme comprises frequency diversity for synchronised switching across a set of different channels within band (e.g. 2.4 to 2.5 GHz), spread spectrum (operating band changes, e.g. 2.4 and 5 GHz), and/or channel blacklisting to eliminate known poorly performing channels, which could include channel blacklisting with a learn mode that includes thruster position. By transmitting the data signal at different frequencies, corruption or nulling of the data signal may be eliminated or reduced and the signal quality improved.

Figure 4:
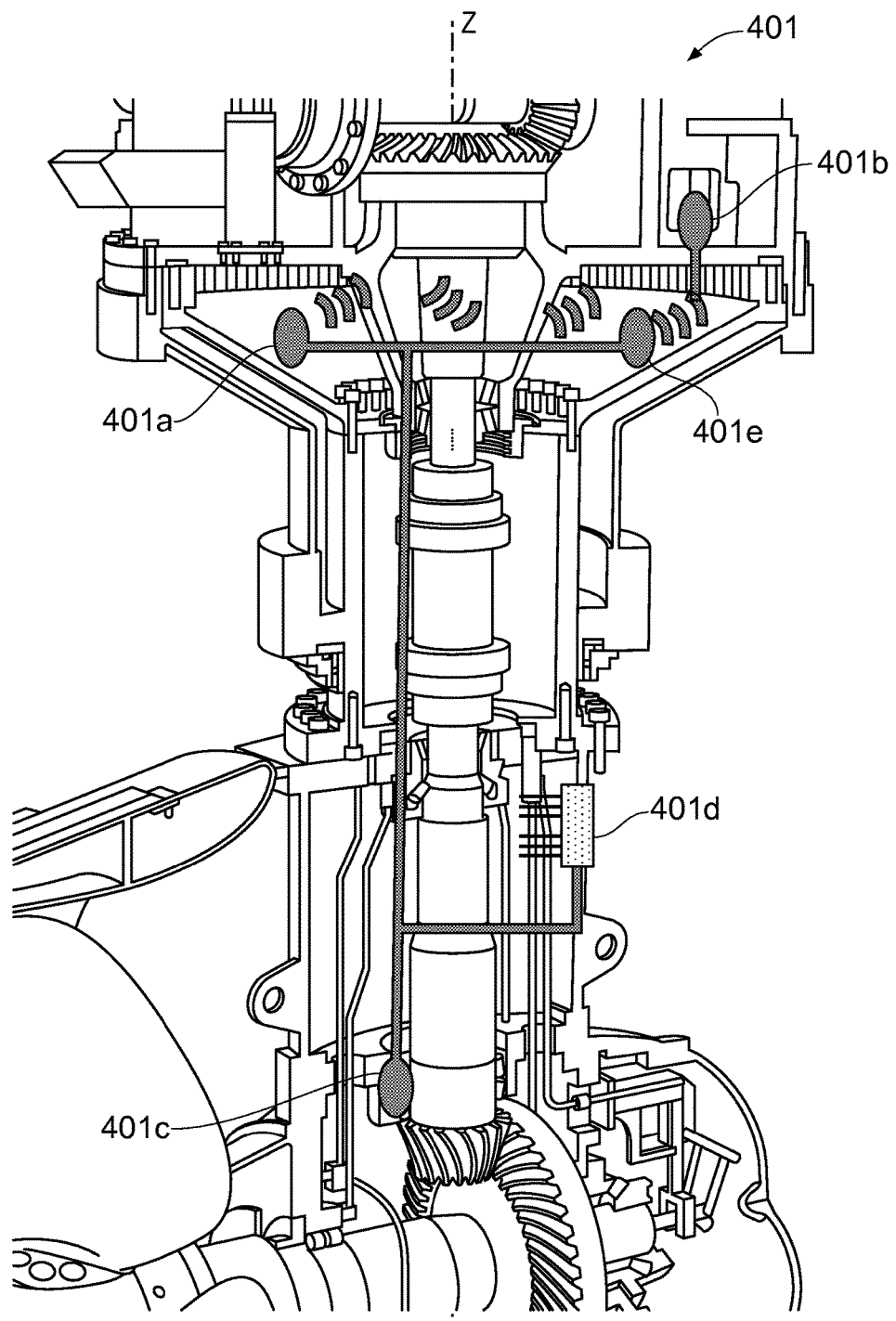
FIGS. 4 to 6 show various arrangements of the wireless communication system.

An alternative, or additional, diversity scheme for mitigating multipath distortion is spatial diversity. In this regard, there is shown in FIG. 4 an embodiment including an additional, or second, transmitter 401e. In this embodiment, the second transmitter 401e is located in the movable section of the upper portion 101a of the thruster 101.

The provision of first and second transmitters 401a, 401e means that the data signal, which is provided to both of the transmitters 401a, 401e by the vibration sensor 401c, can be transmitted to the receiver 401b over a plurality of different, independent propagation paths. Sometimes the receiver 401a receives a stronger signal from the first transmitter 401a, and at other times a stronger signal is received from the second transmitter 401e. A diversity algorithm selects the stronger signal. This "transmission diversity" compensates for multipath interference, eliminating or reducing the possibility of corruption or nulling of the data signal, improving signal quality and reducing required power.

Instead, or in addition, the first and second transmitters 401a, 401e may transmit at different frequencies from each other in order to provide frequency diversity.

The first and second transmitters 401a, 401e may be positioned at any convenient location where they can provide the spatial diversity effect. In this embodiment, the first and second transmitters 401a, 401e are disposed apart on opposite sides of the upper portion 101a, so as to be about 180 degrees apart from each other with respect to the vertical axis Z of the thruster 101. This may be the most efficient arrangement since, depending on the exact structural architecture of the thruster 101, at least one of the first and second transmitters 401a, 401e may have a direct line-of-sight for the data signal to the receiver 401b as the thruster 101 rotates. Even if there are "blind spots", the shorter signal path lengths provided by the multi-transmitter configuration require less radio power, thereby reducing the amount of unwanted signal scatter. Alternatively, the first and second transmitters 401a, 401e could be positioned more closely together, and could even be proximate one another, i.e. co-located. In this case, transmitter type diversity may be applied, for example using dipole and patch antennas.

Figure 5:
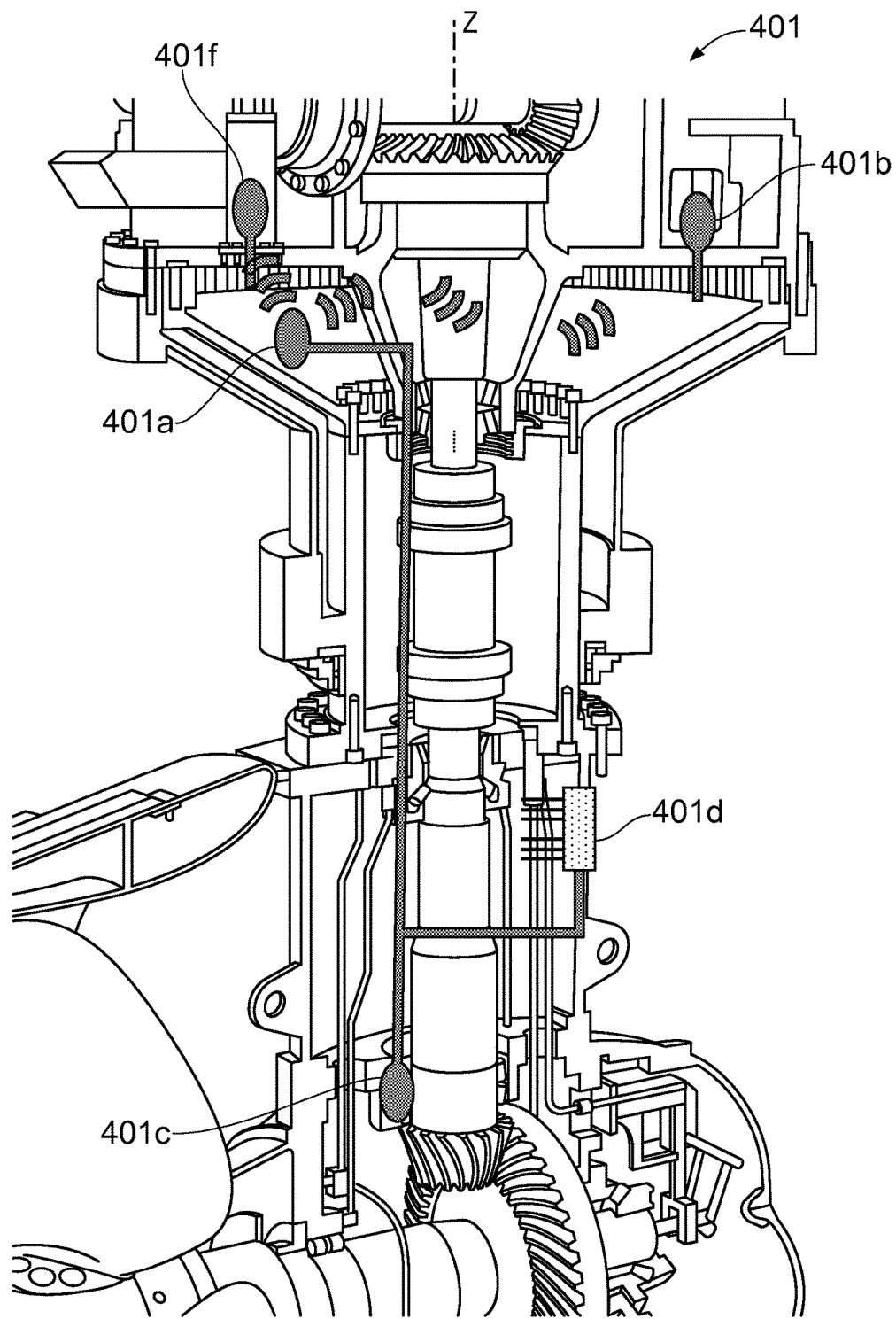

Referring now to FIG. 5, there is shown an embodiment including (one transmitter 401a and) an additional, or second, receiver 401f. In this embodiment, the second receiver 401f is located in the gear compartment 301, i.e. in the fixed section of the upper portion 101a of the thruster 101.

The provision of first and second receivers 401b, 401f means that the data signal can be received from the transmitter 401a over a plurality of different, independent propagation paths. Sometimes the first receiver 401b receives a stronger signal from the transmitter 401a, and at other times a stronger signal is received by the second receiver 401f. A diversity algorithm selects the stronger signal. This "reception diversity" eliminates or reduces the possibility of corruption or nulling of the data signal and improves signal quality.

The first and second receivers 401b, 401f may be positioned at any convenient location where they can provide the spatial diversity effect. In this embodiment, the first and second receivers 401b, 401f are disposed apart on opposite sides of the gear compartment 301, so as to be about 180 degrees apart from each other with respect to the vertical axis Z of the thruster 101. This may be the most efficient arrangement since, depending on the exact structural architecture of the thruster 101, at least one of the first and second receivers 401b, 401f may have a direct line-of-sight for the data signal from the transmitter 401a as the thruster 101 rotates. Even if there are "blind spots", the shorter signal path lengths provided by the multi-receiver configuration require less radio power, thereby reducing the amount of unwanted signal scatter. Alternatively, the first and second receivers 401*b*, 401*f* could be positioned more closely together, and could even be proximate one another, i.e. co-located. In this case, receiver type diversity may be applied, for example using dipole and patch antennas.

Figure 6:
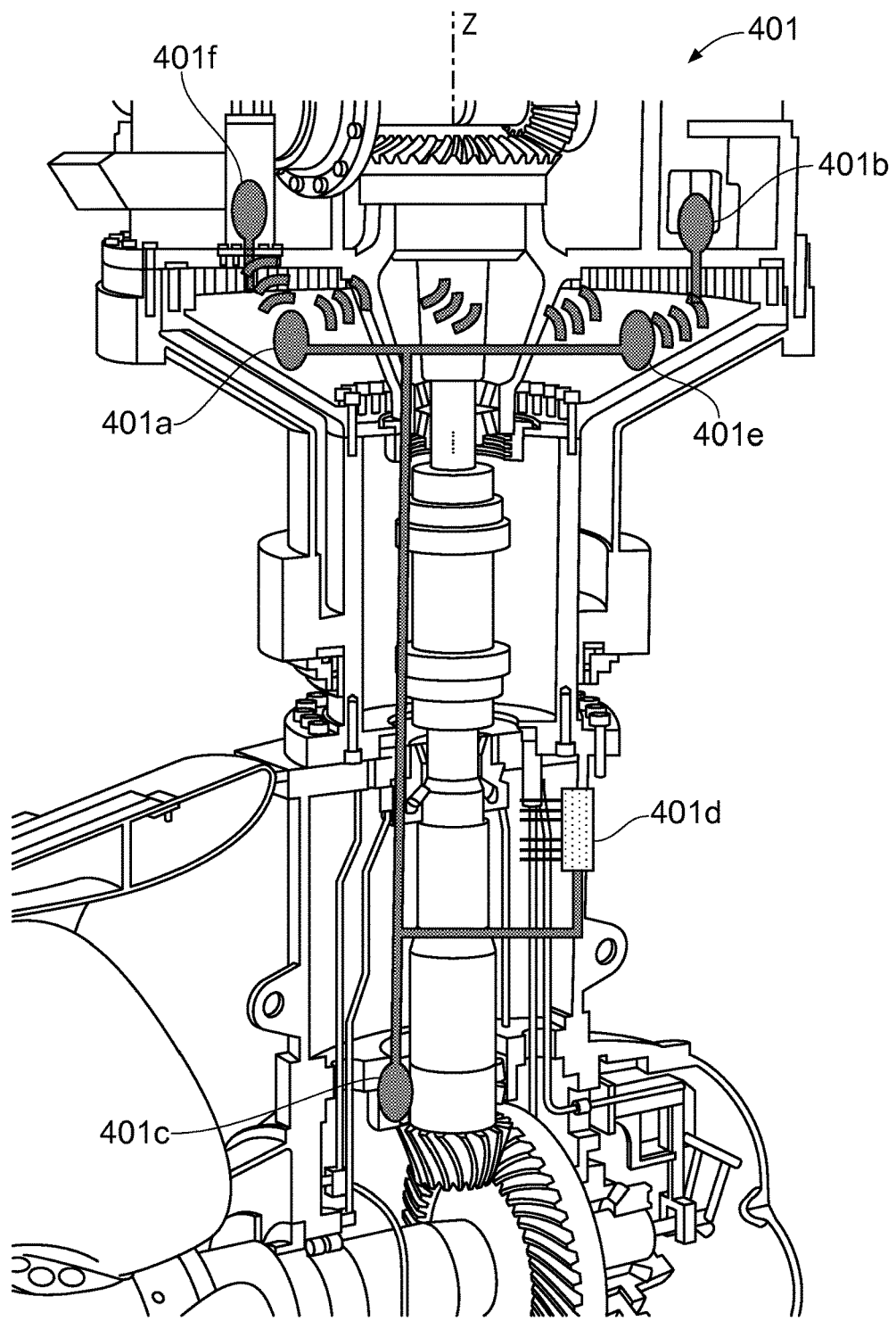

Referring to FIG. 6, there is shown an embodiment including first and second transmitters 401*a*, 401*e*, and first and second receivers 401*b*, 401*f*, for providing both transmission diversity and reception diversity as described herein above with respect to FIGS. 4 and 5.

The terms "transmitter" and "receiver" are used herein to highlight that the wireless communication system 401 predominantly sends a data flow out of the thruster 101 to the vessel. However, as will be understood by the skilled reader, two-way communication can be used in wireless links, for example for error correction or "handshaking" (i.e. a signal sent to acknowledge successful receipt of data) or control of the wireless nodes. Thus, the transmitters and receivers are effectively transceivers, and signals may be conveyed between them in either direction. This may include applications where control data is sent into the thruster, potentially for electric motors.

Preferably, the transmitters and receivers are positioned away from any internal obstructions to reduce saturation and unwanted signal scatter, considering relative positioning as the thruster rotates. In circumstances where metal obstructions (e.g. in-thruster installations, such as motors or pipes) could come into very close proximity (say within 30 to 40 mm) to a transmitter or receiver during steering rotation, signal saturation could occur and result in significant degradation and unacceptable performance. Depending on the angle of occurrence, this is mitigated in a multi-transmitter/receiver spatial diversity solution. This problem is sensitive to transmitter/receiver positioning and therefore can be completely eliminated through careful design and with good knowledge of the thruster's internal architecture.

The inventors have found that an optimum (but non-limiting) arrangement may be one which includes transmission diversity but not reception diversity, due to the receiver's role as a "channel master" in the frequency diversity scheme. Since most of the wireless data transfer (or traffic) will be biased to originate from the transmitters, there is less incentive for the receiver, or access node, to comprise spatial diversity. In this case, the transmitters alone are responsible for ensuring adequate link coverage, therefore eliminating any potential conflict over network control, i.e. the receiver controls frequency diversity while the transmitters control spatial diversity.

Regarding power management of the wireless communication system, it is important to make continuously optimal configuration choices (even when the system is in idle mode) in order to maximise the limited energy that can be harvested from the power source (e.g. thermoelectric generator), and minimise the number of thermoelectric devices that need to be installed (reducing cost and complexity). In this way it may be possible to avoid the need for heavy-duty batteries, which are typically bulky and heavy components.

Intelligent power management strategies may include techniques to maximise harvested energy, e.g. Maximum Power Point Tracking (MPPT) techniques to optimise battery charge and discharge profiles (e.g. charge-cycle management, battery life extension, higher peak-power supply through use of a supercapacitor), and also to optimise the power profile of microprocessor and wireless devices. The latter is useful to optimise availability-versus-performance, by providing adequate levels of system speed/performance required by a task at a given time whilst prolonging the amount of stored energy available depending on availability of source power when the thruster is in operation.

Power management tasks may include efficient voltage step-ups and step-downs across multiple points of the system to power various devices (consumers) that often require "clean" noise-free supply and also reference supplies for accurate data acquisition.

All individual hardware devices including integrated circuits (and lower level components to some extent) may be switched on/off (analogue devices) or switched into lower-power states (available for system-on-chip devices) when unused. This is also a strategy for minimising energy drain when the system is inactive (e.g. idle/sleep modes) because even the lowest idle drain energy, down at micro-Watts, can add up to much energy loss when considering a host energy source that may remain inactive for several weeks and sometimes months, potentially necessitating the system to sustain itself off stored energy alone. Therefore, a technique for remotely powering-up and powering-down the embedded system may be put in place to ensure that the system's primary wireless interface can be shut down or placed into deep-sleep mode to conserve stored energy. Otherwise, after a prolonged period of no-use the system would not be able to monitor start-up, one of the most important periods for a health monitoring system. Here, low-energy near-field communication (NFC) technologies, such as those seen on RFID tags, may present a solution. The concept of using RFID-type wireless communication is a practical and achievable solution because it is relatively low cost, low energy (does not consume any energy in passive mode), and can be suitably used to transmit relatively negligible amounts of data (basically on/off logic).

In laboratory tests the inventors have verified that the radio output power of representative wireless devices assessed, including those from the ultra-low power category, was more than adequate for the data signal to propagate through the maximum through-oil distance of the upper part of the largest size of thruster in the product range.

Figure 7A:
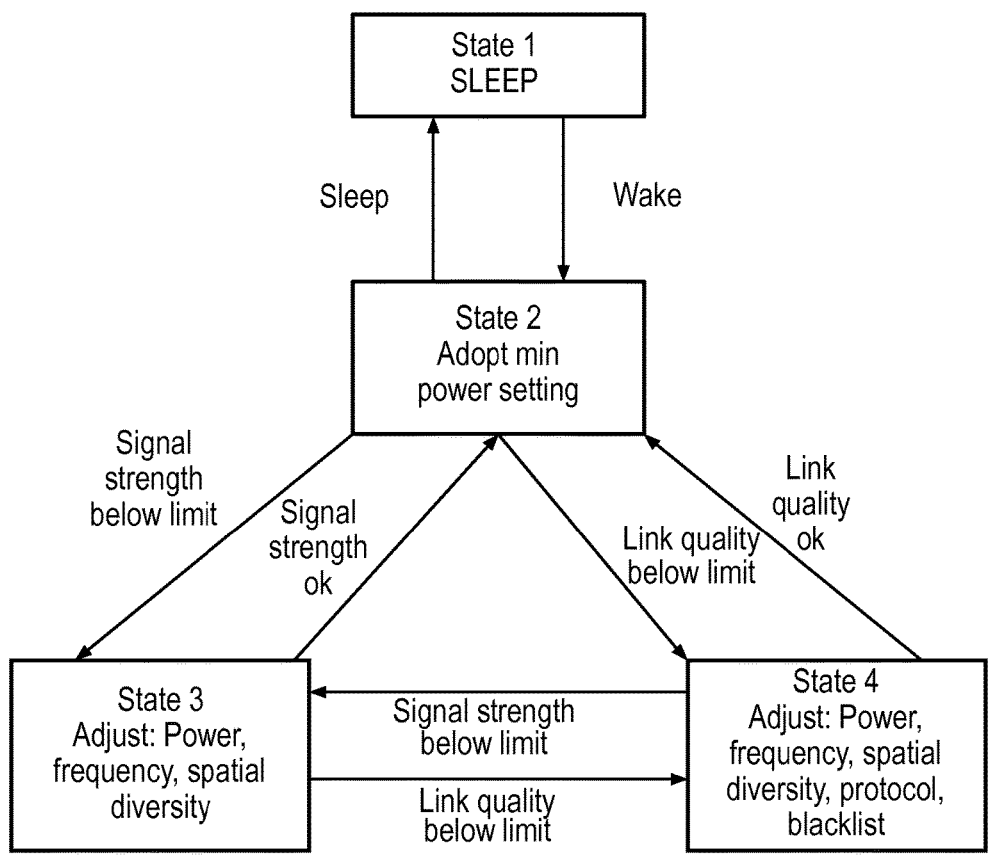
FIGS. 7a and 7b show a method of controlling the wireless communication system.

FIG. 7*a* shows an exemplary control strategy for the wireless communication system. The system is started up (into state 2) from a sleep mode (state 1) and attempts to establish a high-quality data link between the transmitter and receiver. Initially the transmit power is at a predetermined minimum power setting, possibly at the lowest available frequency. If it is determined that the strength of the data signal is not within some predetermined limits, for example because of the attenuation effects of the oil and/or obstacles in the thruster, the system tests the spatial diversity options and selects one that yields the lowest power draw whilst maintaining signal and link quality levels within the specified limits (state 3). A different antenna position may yield a greater signal strength for a given power. Different frequencies may yield greater signal strength, due to interference in certain channels, wave guide effects of features effecting lower frequencies, or greater attenuation at higher frequencies.

Also, if the quality of the data signal is found to be outside some specified interference limits, various other steps may be taken to bring the signal quality within the said limits, such as changing channel and temporary blacklisting the previous channel, altering the protocol or applying forward error correction, and changing spectrum (e.g. 2.4 GHz and 5 GHz), or applying spatial diversity (state 4).

Once a stable setting has been achieved, and after a period of time to ensure stabilisation (e.g. of thruster position), the power may be reduced to the minimum level while maintaining the signal strength and link quality within the specified limits. The order in which the diversity options are tested is set to ensure the minimum power setting is found as soon as possible.

The signal strength requirement may be set to override the link quality requirement (by providing a link between states 3 and 4) to ensure power is not reduced in an attempt to improve link quality to a point where signal strength is lost. Alternatively, link quality may override signal strength. Or, there could be one state or process that finds the optimum of both signal strength and link quality, or the processes may run concurrently, communicating with each other and temporarily blacklisting or limiting options to ensure a solution that meets signal strength and link quality requirements and which is at, or close to, the lowest possible power setting. "Close to" could involve sampling options, i.e. instead of cycling through each channel the system could try every 5 channels. Once it is clear where the optimum is near, the system could accept this, or then focus changes near the best sample point, to find the actual optimum.

Figure 7B:
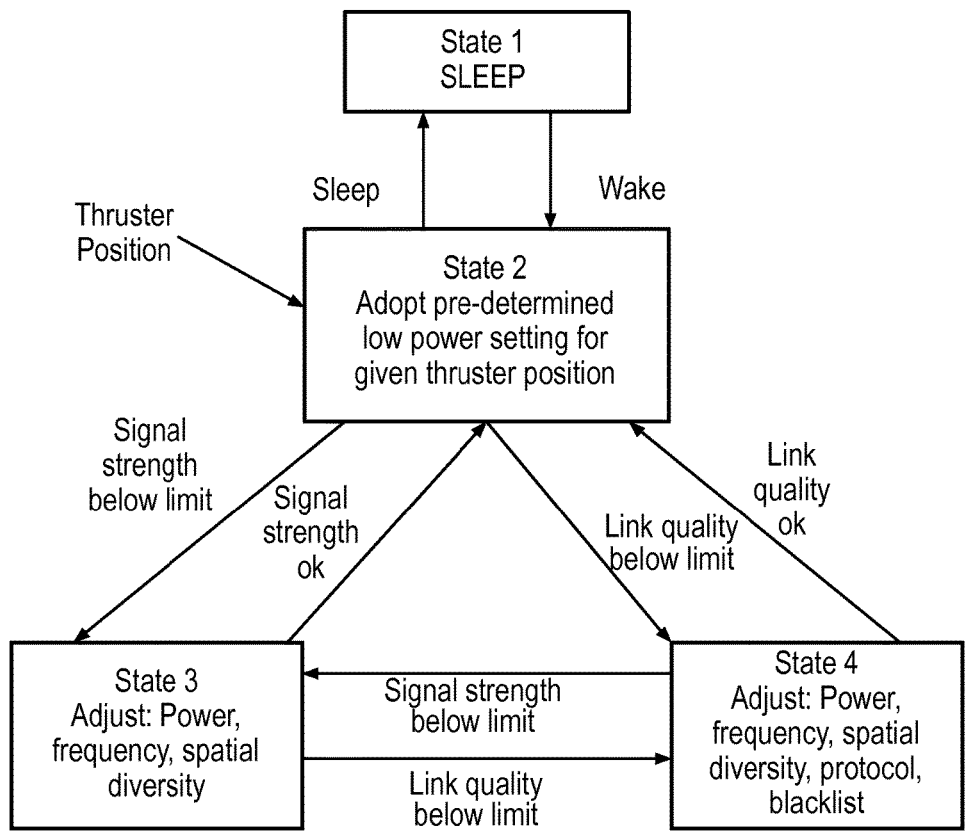

Referring to FIG. 7b, for given thruster positions and conditions (i.e. including the relative positions of the transmitter and receiver), the wireless communication system may "learn" the best combinations of frequency diversity, spatial diversity, and transmit power. Alternatively, this could be pre-programmed, for example based on testing and look-up tables, possibly with minor corrections and learning as conditions change over time, e.g. deterioration of oil quality over the maintenance cycle of the thruster.

In an embodiment, an extra logic loop engages periodically to check whether a lower power setting could be adopted. This could be incorporated in a process in state 2. The period may be set to a time that prevents the system over-analysing and changing settings too often.

Knowledge of the instantaneous Relative Signal Strength Index (RSSI) and Link Quality Indicator (LQI) performance when the wireless communication system is in operation may be used to improve performance by intelligently adopting frequency and/or spatial diversity.

RSSI is an accurate estimate of the signal level in the chosen channel (frequency band). This may be calculated within the receiver itself, based on the measured incoming signal. The RSSI value is dependent on the current gain setting in the receiver (RX) chain and the measured signal level in the channel. In RX mode, the RSSI value may be read continuously from the RSSI status register of the radio hardware integrated circuit. The RSSI value is in dBm with 0.5 dB resolution, although this may be used interchangeably with a percentage value relative to the full operating range of the particular wireless communication system.

LQI is a metric of the current quality of a received signal. LQI is not directly related to the actual signal strength, but the signal quality often is linked to signal strength. LQI gives an understanding of how easily a received signal can be demodulated by accumulating the magnitude or error between ideal values and the received signal. Link quality is important since there is little benefit in having a strong signal if interference means the signal is full of errors.

The wireless communication system and protocols may support some form or other of LQI value for internal use to automatically maintain good link quality. If this is enabled, the value may be automatically appended to the wireless packet along with the actual data payload. To extract this, the value can be read from the LQI status register of the device's RF chip.

The mechanism (algorithm) by which this automated quality control is executed may differ with different devices and different protocols. For example a commercial-off-the-shelf 802.11g Wi-Fi, optimised for use in free-air environments, may not use LQI in the best manner when immersed in oil in the metal enclosure of the thruster, since the rules of engagement are different for the protocol and not solely from physical RF issues, in particular in relation to selection of spatial diversity and the concept of reducing power to reduce multipath interference/fading.

Many encoding methods are possible, for example amplitude frequency or phase shift keying. Also there are many variations, such as Minimum-Shift Keying (MSK) modulation or Offset Quadrature Phase-Shift Keying (OQPSK). Phase shift keying is commonly used in Wi-Fi systems, such as QPSK, and would be suitable (but not limited to) this option. A protocol can have a plurality of encoding methods and the most appropriate method may be chosen according to the conditions.

Redundancy may be added to the transmitted data so that the receiver can restore original data when errors occur. A Forward Error Correction (FEC) scheme may be employed with matrix interleaving to reduce gross bit error rate (BER) near the sensitivity limit. With FEC, redundancy is added to the transmitted data in such a way that the receiver can restore the original data in the presence of some bit errors, therefore increasing robustness. The use of FEC allows correct reception at a lower signal-to-noise ratio, thus extending communication capability under poor propagation conditions. Alternatively, under certain circumstances, with a lower BER less FEC can be used leading to longer packets and ultimately a higher raw data rate. Inside the complex, enclosed thruster environment, transient and time-varying phenomena will inevitably produce occasional errors even in otherwise acceptable reception conditions. FEC has the ability to mask such errors and, possibly combined with interleaving of the coded data, may even correct relatively long periods of faulty reception (also known as burst errors).

A Cyclic Redundancy Check (CRC) scheme is deliberately unused in this protocol configuration. The lack of CRC filtering maximises capture and correction effort, increasing the ability to "repair" relatively bad packets rather than throw them away completely, thus further increasing the wireless link's robustness in poor operating conditions.

Off-the-shelf protocols may be used as a base, such as Wireless Hart or Wi-Fi, but tests show a peak sustained data rate of around 20-30% of their peak capability. Hence the use of adaption and control is useful to improve the data rate and to ensure there are no blind spots (relative to certain thruster positions) and to reduce required power.

The wireless communication system described herein provides a robust and high-quality data link with a high data rate, which cannot be achieved in a marine thruster by a standard Wi-Fi or other off-the-shelf device due to the environmental conditions, i.e. metal obstacles and oil. Diversity schemes mitigate the effects of multipath distortion so that the transmission power may be reduced, enabling the use of an optional low-power thermoelectric generator for powering the wireless communication system. Control strategies or "levers", for example spread spectrum, different channels within a spectrum, and different protocols (different levels of error coding—i.e. increasing protocol robustness), may be intelligently employed to maintain signal quality at a minimal power level. Counter intuitively, reducing power levels can reduce multipath distortion and noise, due to the rate at which oil attenuates signals, meaning it has a noticeable and useful impact on multipath signal strength. The system can eliminate the need for slip rings in the thruster for data transmission and power. Furthermore, the system is easily retrofittable to existing thrusters since it is compact and its elements (transmitter, receiver, sensor, power source) can be positioned at convenient locations within a given thruster.

While the wireless communication system has been described herein above with respect to a "Z-drive" marine thruster, it will be understood that other arrangements are possible, for example an "L-drive" in which the horizontal input shaft is omitted and the vertical drive shaft is driven directly, for example by an engine or a motor. The invention is also applicable to marine propulsors other than azimuth thrusters. Furthermore, the invention may be used in various other marine environments where signal propagation can be difficult around or through small, constrained (especially metal) spaces, such as ship compartments comprising watertight doors, ports or windows, where a suitable waveguide may be found or provided.

The invention also has wider utility, including in enclosed spaces such as oil or fuel tanks, (gas turbine) engines, and gearboxes, as may be found in various industries including aviation, automotive, and (nuclear) power generation.

It will be understood that the invention has been described in relation to its preferred embodiments and may be modified in many different ways without departing from the scope of the invention as defined by the accompanying claims. Furthermore, the skilled reader will understand that the features of the invention as described herein may be arranged in any appropriate combination in the context of its different uses.

The invention claimed is:

1. A marine propulsor, comprising:
   a stationary part and a movable part which is movable relative to the stationary part; and
   a wireless communication system, comprising at least one transmitter which is disposed in the movable part and is configured to transmit an electromagnetic data signal and at least one receiver which is disposed in the stationary part and is configured to receive the electromagnetic data signal,
   wherein the wireless communication system includes a diversity scheme for mitigating multipath distortion of the electromagnetic data signal between the at least one transmitter and the at least one receiver, wherein the diversity scheme includes diversifying a method of wireless communication between the at least one transmitter and the at least one receiver.

2. The marine propulsor according to claim 1, wherein the diversity scheme comprises frequency diversity by which the at least one transmitter is configured to transmit the electromagnetic data signal at different frequencies.

3. The marine propulsor according to claim 1, wherein the movable part is rotatively movable relative to the stationary part about an axis of the thruster so that the at least one transmitter is rotatively movable relative to the at least one receiver.

4. The marine propulsor according to claim 1, wherein the diversity scheme comprises spatial diversity, the wireless communication system comprising at least two transmitters disposed in the movable part to provide transmission diversity and/or at least two receivers disposed in the stationary part to provide reception diversity, wherein the transmission diversity and the reception diversity are types of the spatial diversity which diversify the method of wireless communication.

5. The marine propulsor according to claim 4, wherein the at least two transmitters and/or the at least two receivers are located proximate one another, or wherein the at least two transmitters and/or the at least two receivers are spaced apart from each other.

6. The marine propulsor according to claim 5, wherein the movable part is rotatively movable relative to the stationary part about an axis of the thruster so that the at least one transmitter is rotatively movable relative to the at least one receiver, and wherein the at least two transmitters and/or the at least two receivers are angularly spaced apart from each other with respect to the said axis of the thruster.

7. The marine propulsor according to claim 3, wherein, during one complete revolution of the movable part relative to the stationary part, at least one line of sight exists for the electromagnetic data signal between at least one said transmitter and at least one said receiver.

8. The marine propulsor according to claim 1, wherein the marine propulsor contains a liquid in the path of the electromagnetic data signal.

9. The marine propulsor according to claim 8, wherein the liquid comprises an oil, a grease, a gel, a foam, a fuel, or a hydrocarbon fuel.

10. The marine propulsor according to claim 1, including a thermoelectric generator configured to power the wireless communication system.

11. The marine propulsor according to claim 10, wherein the thermoelectric generator is configured to generate power using a temperature difference between a liquid inside the marine propulsor and water outside the marine propulsor.

12. The marine propulsor according to claim 11, wherein the liquid inside the marine propulsor is of the same type as the liquid in the path of the electromagnetic data signal.

13. The marine propulsor according to claim 1, including a sensor configured to detect a physical parameter of the marine propulsor, the electromagnetic data signal corresponding to the physical parameter.

14. The marine propulsor according to claim 13, wherein the sensor is a vibration sensor.

15. The marine propulsor according to claim 1, wherein the marine propulsor comprises an azimuth thruster.

16. A method of controlling a wireless communication system of a marine propulsor, the marine propulsor comprising a stationary part and a movable part which is movable relative to the stationary part, the wireless communication system comprising at least one transmitter which is disposed in the movable part and is configured to transmit an electromagnetic data signal, and at least one receiver which is disposed in the stationary part and is configured to receive the electromagnetic data signal, the method comprising:
   establishing a data signal between the at least one transmitter and the at least one receiver;
   determining whether the data signal quality and/or strength are within defined limits;
   if the data signal quality and/or strength are not within the defined limits, increasing or decreasing transmission power in order to bring the data signal quality and/or strength within the defined limits;
   if the data signal quality and/or strength are still not within the defined limits, adopting a diversity scheme for mitigating multipath distortion of the electromagnetic data signal between the at least one transmitter and the at least one receiver in order to bring the data signal quality and/or strength within the defined limits, wherein the diversity scheme includes diversifying a method of wireless communication between the at least one transmitter and the at least one receiver; and if the data signal quality and/or strength are within the defined limits, decreasing transmission power to a minimum level required to maintain the data signal quality and/or strength within the defined limits.

17. The method according to claim 16, wherein adopting the diversity scheme comprises adopting frequency diversity by which the at least one transmitter is configured to transmit the electromagnetic data signal at different frequencies.

18. The method according to claim 16, wherein adopting the diversity scheme comprises adopting spatial diversity, the wireless communication system comprising at least two transmitters disposed in the movable part to provide transmission diversity, and/or at least two receivers disposed in the stationary part to provide reception diversity, wherein the transmission diversity and the reception diversity are types of the spatial diversity which diversify the method of wireless communication.

19. A thermoelectric device for a marine propulsor, the thermoelectric device being configured when installed in the marine propulsor to generate power using a temperature difference between a liquid inside the marine propulsor and water outside the marine propulsor, the water being cooler than the liquid, the thermoelectric device comprising thermal insulation for providing a spot at an interface between the thermoelectric device and the marine propulsor for the water to impact the thermoelectric device.

20. The thermoelectric device according to claim 19, including a compressible metal alloy for providing thermal contact with the marine propulsor at the said interface.

* * * * *